(12) United States Patent
Less et al.

(10) Patent No.: US 8,852,787 B2
(45) Date of Patent: Oct. 7, 2014

(54) BATTERIES HAVING INORGANIC/ORGANIC POROUS FILMS

(75) Inventors: Gregory B. Less, Ypsilanti, MI (US); Susan J. Babinec, Midland, MI (US); Gilbert N. Riley, Jr., Marlborough, MA (US)

(73) Assignee: A123 Systems LLC, Livonia, MI (US)

( * ) Notice: Subject to any disclaimer, the term of this patent is extended or adjusted under 35 U.S.C. 154(b) by 1278 days.

(21) Appl. No.: 12/240,855

(22) Filed: Sep. 29, 2008

(65) Prior Publication Data

US 2009/0087728 A1 Apr. 2, 2009

Related U.S. Application Data

(60) Provisional application No. 60/995,777, filed on Sep. 28, 2007.

(51) Int. Cl.
*H01M 2/16* (2006.01)
*H01M 10/0525* (2010.01)
*H01M 4/13* (2010.01)

(52) U.S. Cl.
CPC .......... *H01M 10/0525* (2013.01); *H01M 2/166* (2013.01); *Y02E 60/122* (2013.01); *H01M 2/162* (2013.01); *H01M 2/1686* (2013.01); *H01M 2/1673* (2013.01); *H01M 2/1666* (2013.01); *H01M 2/1653* (2013.01); *H01M 4/13* (2013.01)
USPC ............................. 429/144; 429/129; 429/142

(58) Field of Classification Search
None
See application file for complete search history.

(56) References Cited

U.S. PATENT DOCUMENTS

| | | | |
|---|---|---|---|
| 3,861,963 A | 1/1975 | Afrance et al. | |
| 4,224,393 A | 9/1980 | Feinberg et al. | |
| 5,194,341 A | 3/1993 | Bagley et al. | |
| 5,418,091 A | 5/1995 | Gozdz et al. | |
| 5,641,565 A | 6/1997 | Sogo et al. | |
| 5,643,695 A | 7/1997 | Barker et al. | |
| 5,691,047 A | 11/1997 | Kurauchi et al. | |
| 5,720,780 A | 2/1998 | Liu et al. | |
| 5,871,867 A | 2/1999 | Rausch et al. | |
| 5,882,721 A | 3/1999 | Delnick | |

(Continued)

FOREIGN PATENT DOCUMENTS

| | | |
|---|---|---|
| EP | 1667254 A1 | 6/2006 |
| EP | 1753056 A1 | 2/2007 |

(Continued)

OTHER PUBLICATIONS

International Search Report and Written Opinion, International Patent Application No. PCT/US08/078133, mailed Feb. 17, 2009 (8 pages).

(Continued)

*Primary Examiner* — Ula C Ruddock
*Assistant Examiner* — Scott J Chmielecki
(74) *Attorney, Agent, or Firm* — Alleman Hall McCoy Russell & Tuttle LLP (57) ABSTRACT

An electrochemical cell, such as Li-Ion, having (a) a positive electrode; (b) a negative electrode, (c) a porous inorganic/organic composite layer interposed between the positive electrode and the negative electrode, and (d) an electrolyte comprising a lithium salt and a non-aqueous solvent. The composite layer includes inorganic nanoparticles and a binder to form a nanocomposite separator (NCS). In addition to the composite layer, the electrochemical cell includes a porous separator.

32 Claims, 10 Drawing Sheets

(56) References Cited

U.S. PATENT DOCUMENTS

| | | | |
|---|---|---|---|
| 5,894,656 A | 4/1999 | Menon et al. | |
| 5,935,543 A | 8/1999 | Boyer et al. | |
| 5,948,464 A | 9/1999 | Delnick | |
| 5,981,107 A | 11/1999 | Hamano et al. | |
| 6,077,468 A | 6/2000 | Jariwala et al. | |
| 6,148,503 A | 11/2000 | Delnick et al. | |
| 6,153,337 A | 11/2000 | Carlson et al. | |
| 6,180,281 B1 | 1/2001 | Schneider et al. | |
| 6,235,065 B1 | 5/2001 | Pasquier | |
| 6,277,514 B1 | 8/2001 | Ying et al. | |
| 6,447,951 B1 | 9/2002 | Barker et al. | |
| 6,511,517 B1 | 1/2003 | Ullrich et al. | |
| 6,511,774 B1 | 1/2003 | Tsukuda et al. | |
| 6,562,511 B2 | 5/2003 | Daroux et al. | |
| 6,821,672 B2 | 11/2004 | Zguris | |
| 6,913,855 B2 | 7/2005 | Stoker et al. | |
| 7,097,818 B2 | 8/2006 | Lindner et al. | |
| 7,214,448 B2 | 5/2007 | Barker et al. | |
| 7,704,641 B2 | 4/2010 | Yong et al. | |
| 2001/0000485 A1 | 4/2001 | Ying et al. | |
| 2002/0102455 A1 | 8/2002 | Daroux et al. | |
| 2002/0165291 A1 | 11/2002 | Choi | |
| 2004/0018428 A1 | 1/2004 | Cochran et al. | |
| 2004/0053122 A1* | 3/2004 | Sugiyama et al. | 429/144 |
| 2004/0053123 A1 | 3/2004 | Chang et al. | |
| 2004/0166407 A1 | 8/2004 | Nakajima et al. | |
| 2004/0214084 A1 | 10/2004 | Barker et al. | |
| 2004/0240155 A1* | 12/2004 | Miltich et al. | 361/512 |
| 2004/0262571 A1 | 12/2004 | Barker et al. | |
| 2005/0031942 A1 | 2/2005 | Hennige et al. | |
| 2005/0084761 A1 | 4/2005 | Hennige et al. | |
| 2005/0095505 A1 | 5/2005 | Ohata et al. | |
| 2005/0208383 A1 | 9/2005 | Totsuka et al. | |
| 2005/0255769 A1 | 11/2005 | Henninge et al. | |
| 2006/0008700 A1* | 1/2006 | Yong et al. | 429/144 |
| 2006/0024569 A1 | 2/2006 | Hennige et al. | |
| 2006/0046138 A1 | 3/2006 | Hennige et al. | |
| 2006/0046149 A1 | 3/2006 | Yong et al. | |
| 2006/0078791 A1 | 4/2006 | Hennige et al. | |
| 2006/0093541 A1 | 5/2006 | Uhrlandt et al. | |
| 2006/0105245 A1 | 5/2006 | Ikuta et al. | |
| 2006/0166085 A1 | 7/2006 | Hennige et al. | |
| 2006/0254463 A1 | 11/2006 | Luginsland et al. | |
| 2006/0292450 A1 | 12/2006 | Nakanishi et al. | |
| 2007/0099072 A1 | 5/2007 | Hennige et al. | |
| 2007/0122716 A1 | 5/2007 | Seo et al. | |
| 2009/0155678 A1 | 6/2009 | Less et al. | |
| 2010/0261065 A1 | 10/2010 | Babinec et al. | |

FOREIGN PATENT DOCUMENTS

| | | |
|---|---|---|
| JP | 2001319634 | 11/2001 |
| JP | 2005294139 A | 10/2005 |
| JP | 2005327680 A | 11/2005 |
| KR | 102007008024 | 8/2007 |
| WO | WO-94/20995 A2 | 9/1994 |
| WO | WO-02082565 A2 | 10/2002 |
| WO | WO-2005098997 A1 | 10/2005 |
| WO | WO-2006/045339 A2 | 4/2006 |
| WO | WO-2006068428 A1 | 6/2006 |
| WO | WO-2009026467 A1 | 2/2009 |

OTHER PUBLICATIONS

Venugopal, Ganesh et al. "Characterization of microporous separators for lithium-ion batteries" Journal of Power Sources, 77(1999) 34-41.

Supplementary European Search Report for European Patent Application No. 08833067.5 mailed Dec. Sep. 15, 2011. 9 pages.

International Search Report and Written Opinion, International Application No. PCT/US08/73924, mailed Jan. 19, 2009 (7 pages).

"Micropore in Catalysis." IUPAC Compedium of Chemical Terminology. Jun. 12, 2009 IUPAC, Research Triangle Park, NC XP55011608. 1 page.

Supplementary European Search Report for European Patent Application No. EP08827786.8 mailed Nov. 17, 2011. 14 pages.

Tarascon J-M et al. "Performance of Bellcore's Plastic Rechargeable Li-ion Batteries." Solid State Ionics. North Holland Pub. Company, Amsterdam, The Netherlands. vol. 86-88, Jan. 1, 1996, 49-54. 6 pages.

International Search Report and Written Opinion for International Application No. PCT/US10/20769 mailed Mar. 2, 2010. 8 pages.

Gamsjäger, Heinz et al. "Glossary of Terms Related to Solubility." Pure Appl. Chem. vol. 80, No. 2. pp. 233-276. Jan. 2008, 44 pages.

\* cited by examiner

BATTERIES HAVING INORGANIC/ORGANIC POROUS FILMS

CROSS-REFERENCE

This application is a non-provisional application of U.S. Provisional Application No. 60/995,777, filed Sep. 28, 2007.

FIELD OF THE INVENTION

This invention relates generally to electrochemical cells. More specifically, the invention relates to battery cells and a separator configuration for electrochemical battery cells.

BACKGROUND OF THE INVENTION

Separator membranes are important components of batteries. These membranes serve to prevent contact of the anode and cathode of the battery while permitting electrolyte to pass there through. Additionally, battery performance attributes such as cycle life and power can be significantly affected by the choice of separator. Safety can also be related to separator attributes, and certain separators are known to reduce occurrence of Li metal plating at the anode and even dendrite formation.

Separator membranes of battery cells are, in some instances, formed from bodies of porous polymer materials. In other instances, separator membranes are formed from bodies of fibrous or particulate material, and such materials can include glass fibers, mineral fibers such as asbestos, ceramics, synthetic polymeric fibers as well as natural polymeric fibers such as cellulose.

There are a number of problems with the presently utilized separator membranes. Such membranes materials are often expensive, and given the fact that a typical battery system will include relatively large volumes of membranes, the cost of the membranes can be a significant component of overall battery costs.

Low cost battery separator membrane materials can be inefficient in preventing dendrite bridging, and hence must be made relatively thick. However, this thickness increases the internal resistance of the battery thereby decreasing its efficiency, and also increases battery size.

Thus, there is a need for a separator configuration that is efficient, low in cost, safe and easy to utilize. Currently, separators for lithium ion cells are expensive—averaging ~$2.00/m$^2$, which is about 11% of the cost in a high energy cell and ~23% of the cost of a high power cell. To further reduce the cost of lithium ion batteries, an inexpensive separator needs to be developed.

SUMMARY OF EXEMPLARY EMBODIMENTS OF THE INVENTION

An organic/inorganic composite film and porous or non-porous separator combination for electrochemical cells is described. This film is a composite of inorganic particles and polymeric binder. The composite materials are low in cost and additionally function to provide high performance separator membrane structures which have excellent adhesion to electrodes and which improve safety and have high dimensional stability at high temperatures. The electrode/film assembly exhibits excellent adhesion between the layers and does not delaminate from its substrate (current collector) even when wound, bent, flexed or otherwise deformed. In addition, a porous separator is disposed adjacent to the composite film to facilitate cell assembly.

In one aspect, an electrochemical cell, such as Li-Ion, has a positive electrode; a negative electrode, a porous inorganic/organic composite layer interposed between the positive electrode and the negative electrode, and an electrolyte comprising a lithium salt and a non-aqueous solvent. The composite layer includes inorganic nanoparticles and a binder to form a nanocomposite separator (NCS). In addition to the composite layer, the electrochemical cell includes a porous or non-porous separator between the two NCS coated electrodes.

In another aspect, an electrode/separator assembly is provided for use in an electrochemical cell. The assembly includes a current collector; and a porous composite electrode adhered to the current collector. The electrode includes at least electroactive particles and a binder. The assembly also includes a porous composite layer comprising inorganic particles substantially uniformly distributed in a polymer matrix to form nanopores, wherein the composite layer is secured to the electrode layer by a solvent weld at the interface between the two layers. The weld includes a mixture of the binder and the polymer. A porous or non-porous separator is disposed between the NCS coated electrodes.

In one embodiment, the composite film comprises electrochemically stable inorganic particles having a particle size less than 1 μm in an electrochemically stable polymer matrix, and at least a bimodal pore distribution, wherein the first, smaller sized pores are substantially uniformly distributed in the layer, and one or more larger pore sizes are randomly distributed in the layer. The dimensions of the pores are nanoscale.

In one embodiment, the first smaller pore size is in the range of about 5-100 nm and larger pore size is in the range of about 100-500 nm. The particles are substantially monodisperse and have a particle size in the range of about 10-50 nm. The composite layer has a pore volume fraction of greater than 25%.

In one embodiment, the binder is between 5% and 60% of the inorganic/organic composite composition. The composite layer may have inorganic particles and polymer binder in a weight ratio of about 95:5 to about 40:60 inorganic particles: polymer.

In one embodiment, the inorganic material of the film is selected from the group consisting of silica, alumina, titanium oxide, natural and synthetic zeolites and other electrochemically stable inorganic particles of appropriate particle size.

In one embodiment, the porous separator is a microporous polyolefin separator having pores greater than 50-100 Å in diameter and comprises film of at least one of polypropylene, polyethylene, or a laminate thereof.

In one embodiment, the separator comprises polyethylene oxide.

In one embodiment, the porous separator is a non-woven textile material made from fibers held together by at least one of friction, cohesion, and adhesion. The porous separator may have a thickness in the range of about 9 μm to 15 μm and the composite film may have a thickness in the range of about 2 μm to 16 μm.

In another aspect, a separator configuration is provided for an electrochemical cell that includes a composite layer disposed on one or both electrodes. The composite layer includes ceramic particles having a particle size in the range of about 10 nm to about 200 nm in a polymer matrix. The particles can typically be below one micron diameter, and are more typically 15-30 nm. In some embodiments, the layer has at least a bimodal pore distribution, wherein the first, smaller sized pores are substantially uniformly distributed in the layer, and one or more larger pore sizes are randomly distributed in the layer, wherein the dimension of both pores are nanoscale. A porous separator is disposed between the composite layer and the electrodes.

In another aspect, a method of preparing an electrode/separator assembly for an electrochemical cell is provided. The method includes providing a porous composite electrode layer comprising at least electroactive particles and a binder; and providing a coating solution. The coating solution includes a polymer, solvent system for the polymer, and inorganic particles dispersed in the solvent, wherein the solvent system is selected to have at least some solubility for the binder of the electrode layer. The method further includes coating a surface of the electrode layer with a layer of the coating solution. The coating solution penetrates a fraction of the thickness of the electrode layer and dissolves a portion of the binder. The solvent is removed from the coating solution layer to deposit a porous composite layer. The composite layer comprises inorganic particles substantially uniformly distributed in the polymer and has a pore volume fraction of at least 25%. A solvent weld is formed at an interface between the porous electrode layer and the porous composite layer. A porous or non-porous separator is provided adjacent the porous composite layer An aspect of the method provides for the weight ratio of inorganic particles and polymer in the coating solution to be about 65:35 to about 45:55. The coating solution penetrates up to 90% of the thickness of the electrode layer and may be carried out by a technique selected from the group consisting of spray coating, doctor blading, slot die coating, gravure coating, ink jet printing, spin coating, dip coating and screen printing, or other techniques. Spray coating the surface of the electrode may comprise spray coating a plurality of layers of the coating solution onto the surface of the electrode. In accordance with a further aspect of the invention, the coated layer may be dried between each spray coating step. Removing the solvent may include evaporating the solvent and/or extracting the solvent with a material which is a non-solvent for the polymer.

BRIEF DESCRIPTION OF THE DRAWING

The invention is described with reference to the figures listed below, which are presented for the purpose of illustration only and are not intended to be limiting of the invention.

DETAILED DESCRIPTION OF EXEMPLARY EMBODIMENTS

Inorganic/organic porous films can be coated onto electrodes and used as separators in Li-Ion batteries. They are desirable due to their potential to significantly decrease cell cost and to improve cell safety. A nanocomposite separator (NCS) that is a composite of inorganic filler and polymer binder is described in U.S. Patent Application No. 60/957,101 and Ser. No. 12/196,203, filed respectively on Aug. 21, 2007 and Aug. 21, 2008, entitled "SEPARATOR FOR ELECTROCHEMICAL CELL AND METHOD FOR ITS MANUFACTURE," which are hereby incorporated by reference. The NCS has been contemplated for use as a replacement for porous membranes, requiring the need to reduce leakage current via a substantially crack-free film and coated edges. While significant advances have been made (and are the subject of a separate patent application), an alternative solution is to implement the NCS coating technology, on either one or both of the electrodes, and additionally also use a porous separator. The coated electrode(s) and porous or nonporous separator are intended for use in an electrochemical cell. Exemplary porous separators include microporous polyethylene, or polypropylene films. The separator can be fully dense instead of porous and could for example include then polyethylene oxide. The NCS coating could be used on either anode or cathode.

Figure 1:
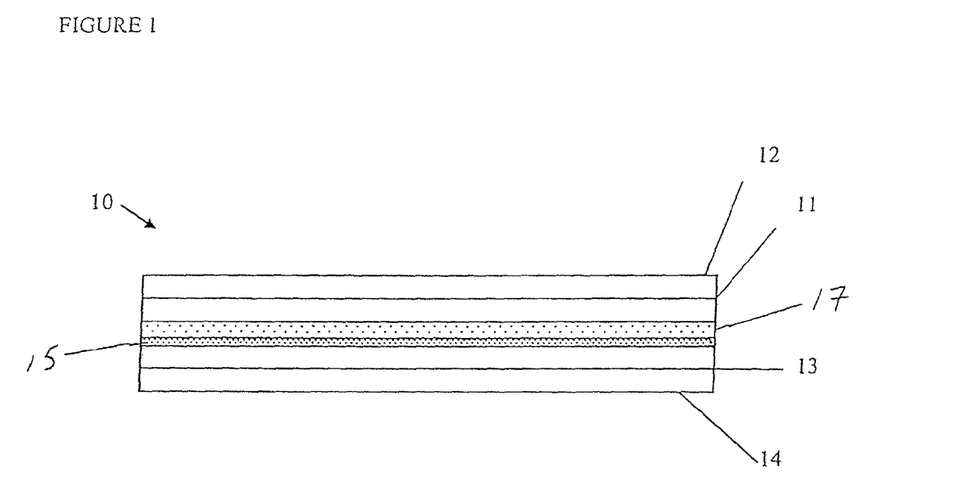
FIG. 1 is a schematic illustration of an electrochemical cell including a porous separator according to one or more embodiments of the invention.
Figure 2A:
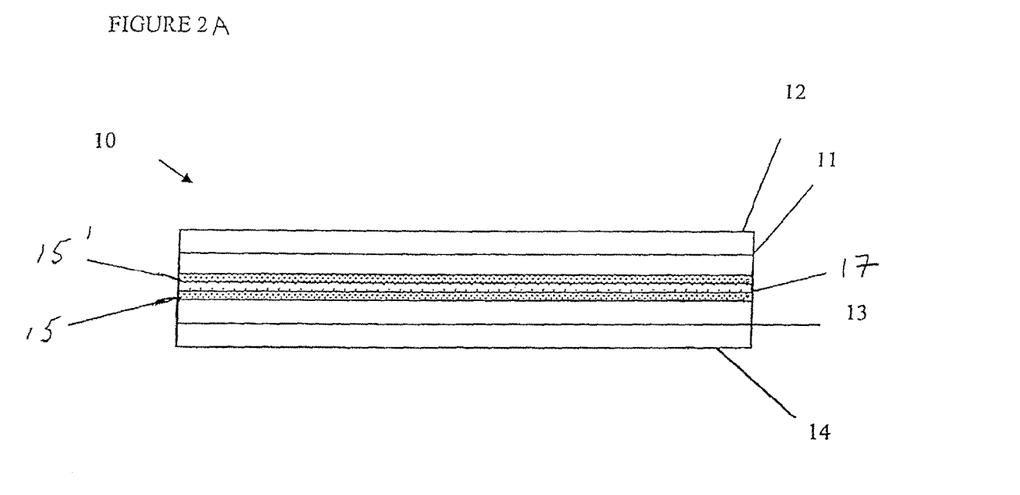
FIG. 2A is a schematic illustration of an electrochemical cell including a porous separator according to one or more embodiments of the invention.
Figure 2B:
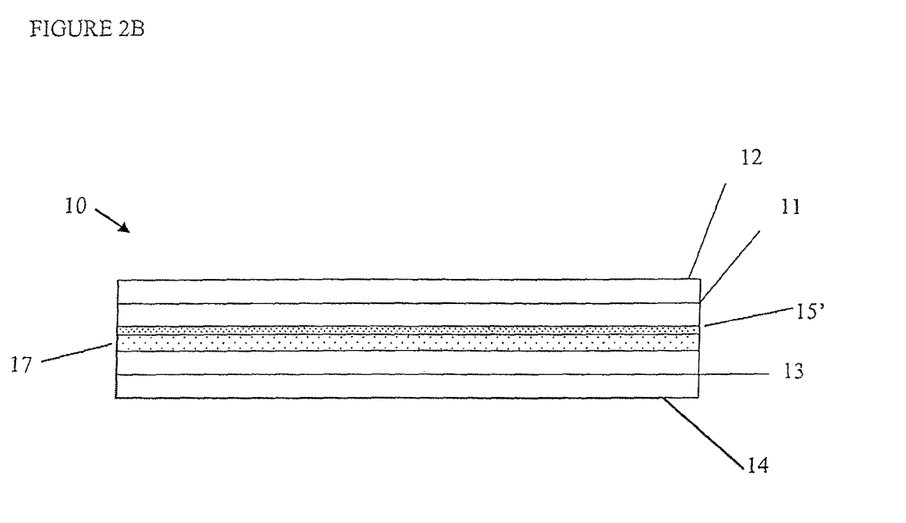
FIG. 2B is a schematic illustration of an electrochemical cell including a porous separator according to one or more embodiments of the invention.

Reference is made to FIG. 1, which illustrates an exemplary electrochemical cell 10 including a cathode active layer 11, a cathode substrate or current collector 12, an anode active layer 13 and an anode substrate or current collector 14. The cathode and/or the anode active layer typically include a porous particulate composite including an electrode active material, a conductive additive and a polymer binder. An NCS layer 15 and a porous separator 17 separate the electrode layers. The NCS layer may be provided on only one electrode, as shown in FIG. 1, and this may equally be either the anode or the cathode. Alternatively, NCS layers 15 and 15' may be provided on both electrodes, as shown in FIG. 2A. A liquid electrolyte permeates the NCS layer(s) 15 and 15' and porous separator 17. The current collector is in contact with its respective electrode layer to permit current flow during charge and discharge cycles of the electrochemical cell. The cells may be stacked or wound together to form a prismatic or spirally wound battery. In such instances, the electrode may be coated on both sides with an electroactive layer. FIG. 2B shows the NCS layer 15' on only the cathode 11.

The polymer binder of the NCS is selected from those polymers which are compatible with the chemistry of a particular battery system. The polymer should be electrically insulating, should have low solubility in electrolyte solvents and be chemically and electrochemically stable in the cell. One group of polymers having utility in lithium and lithium ion battery systems, as well as other battery systems, includes fluorinated polymers and latex polymers such as styrene butadiene and other styrene-based polymers. Polyvinylidene fluoride polymer compositions are one group of polymers having specific utility. There are a variety of such materials known and available in the art, and such materials may comprise essentially homogeneous PVDF as well as blends and copolymers. One particular material is a PVDF material sold under the trademark Kureha 7208. Other equivalent and similar materials may likewise be employed.

The inorganic component of the NCS may be selected from a variety of natural and artificial materials that are compatible with the particular battery systems and chemistry in which the membranes are to be incorporated. Mixtures of two or more suitable inorganic components are contemplated. The inorganic component may be a ceramic material. One particular group of ceramic materials comprises silica, with fumed silica being one specific form of silica which may be employed. Fumed silica is a high surface area, generally high purity silica material. Fumed silica is generally hydrophilic and can be wetted easily by most electrolyte solvents and many polar polymers. A material which has been used in one or more embodiments has a surface area of approximately 200 $m^2/g$. The particles are very small and typically are less than 200 nm in diameter, and more typically about 10-20 nm, e.g., about 14 nm. In one or more embodiments, the ceramic material is fumed silica having a narrow particle size distribution and a substantially spherical shape. Fumed silica can be prepared in a carefully controlled reaction of silicon tetrachloride ($SiCl_4$) that results in a highly controllable and narrow particle size distribution. In one embodiment, a fumed silica having a particle size of about 14 nm may be employed.

Other silicon compounds may be utilized as a ceramic component of the membranes, such as for example, polyhedral oligomeric silesquioxane (POSS), which in the context of this disclosure is considered to be a ceramic material. Other ceramic materials include natural and synthetic zeolites, alumina, and the like. The ceramic materials may be used either singly or in combination, with uniform or mixed sizes and shapes as well.

The proportions of polymer and ceramic may vary over a relatively wide range; however, the ceramic material, in some embodiments, is a major component of the resultant separator. In some instances, the ratio of ceramic to polymer may range, on a weight basis, from 95:5 to 40:60. In one specific instance, the membrane will comprise, on a weight basis, approximately 65% fumed silica and 35% PVDF. The ceramic material and polymer are combined in a solvent system to form a uniform distribution of ceramic particles in the dissolved polymer/solvent system. The highly uniform distribution of polymer and ceramic in the coating solution provides a highly uniform distribution of polymer and ceramic materials in the resultant membrane.

The NCS layer 15 includes inorganic nanoparticles and the binder. The NCS layer may comprise electrochemically stable inorganic particles having a particle size less than 1 μm in an electrochemically stable polymer matrix, and a bimodal pore distribution, wherein the first, smaller sized pores are substantially uniformly distributed in the layer, and one or more larger pore sizes are randomly distributed in the layer. The dimensions of the pores are nanoscale. In one embodiment, the first smaller pore size is in the range of about 5-100 nm and larger pore size is in the range of about 100-500 nm. In an embodiment, the particles are substantially monodisperse and have a particle size in the range of about 10-50 nm. The composite layer may have a pore volume fraction of greater than 25%. The binder of the NCS layer is, in one embodiment, between 5% and 60% of the inorganic/organic composite composition. The composite layer may have inorganic particles and polymer binder in a weight ratio of about 95:5 to about 40:60 inorganic particles: polymer.

In one embodiment, fumed silica is dispersed with a polymeric binder in a mixture of two solvents. The fumed silica used is generally a hydrophilic silica with a surface area of approximately 200 $m^2/g$. Typically, the binder is a polyvinylidene fluoride (PVdF) such as Kureha 7208. The exact ratio of silica to binder in the separator may range from about 50:50 to about 95:5. A typical formulation is about 65:35. The solvent system is a binary blend with NMP. The co-solvent- and solids loading choices varying, depending on the type of coating technology used. By way of example, with comma and die-slot coating, propyl acetate and 5-10% solid solutions are used; with HVLP or ultrasonic spray coating, acetone and ~2-4% solids solutions are used.

The porous separator 17 is from any of the families of separators generally classified as molded, woven, non-woven, microporous, bonded, paper or laminate. For these materials to operate as the separator 17 in accordance with the present invention, they should be electronically insulating and have minimal ionic resistance, in addition to being readily wetted by electrolyte. The separator 17 should be uniform in physical and mechanical properties and provide mechanical and dimensional stability, in addition to chemical and electrochemical stability within the cell environment.

An exemplary separator is a microporous polyolefin separator having pores greater than 50-100 Å in diameter provided in films of polypropylene, polyethylene or a laminate of polypropylene and polyethylene. Non-woven separators include, for example, textile products made from fibers laid down in a sheet or mat and held together with at least one of friction, cohesion, and adhesion.

In an exemplary embodiment, the microporous or non-woven membrane separators 17 have a thickness in the range of 9-15 μm. This thickness is advantageous because it maximizes capacity with respect to size. The use of a microporous or non-woven membrane separator 17 in the range of substantially 9-15 μm is traditionally not considered to have the mechanically robust attributes needed in a Li-Ion battery. However, an aspect of the present invention is to use a thin porous separator 17 having thicknesses not previously believed acceptable for Li-Ion battery applications. The combination of the NCS 15 with the disclosed separator 17 reduces the necessity of providing a perfectly crack free NCS, which is otherwise desired when an NCS is used by itself.

In another exemplary embodiment, the nonporous membrane separators 17 have a thickness in the range of 9-15 μm. The use of nonporous polyethylene oxide, polyvinylidene fluorides, substituted polyphosphazenes or similar ionically conducting polymer films, is traditionally also not considered to have the mechanically robust attributes needed in a Li-Ion battery. However an aspect of the present invention is to use a thin nonporous separator with the NCS layer. The combination of the NCS 15 with the disclosed separator 17 reduces the necessity of providing a perfectly crack free NCS, which is otherwise desired when an NCS is used by itself.

The NCS layer may be on either the anode, cathode or both, as illustrated in FIGS. 1, 2A and 2B. An aspect of the invention is to provide mechanically robust features without unduly increasing the size of the electrochemical cell or battery. This is accomplished by providing the combination of the NSC layer 15 and porous or nonporous separator 17 with a predetermined range of thicknesses. The range of thickness for the NSC layer 15 is about 2 to 16 μm. Likewise, if the additional NSC layer 15' is provided, the combined total of all NCS layers is about 2 to 16 μm. The porous or nonporous separator 17 has a thickness in the range of about 9 to 15 μm.

As noted above, the NSC layer 15 may be provided on only one of the cathode and anode, along with the porous separator 17. If this configuration is applied, the combined thickness of the NSC layer 15 and the porous separator 17 is in a range of about 11-25 µm and should be not thicker than about 25 µm. Alternatively, both NSC layers 15 and 15' may be utilized; one being on the cathode and the other on the facing anode, with the porous separator 17 therebetween, as shown in FIG. 2A. In this configuration, the combined thickness of the NSC layers 15 and 15', in addition to the porous or nonporous separator 15 is in a range of about 11 to 25 µm.

Embodiments of the invention provide a synergistic combination of the NCS 15 with a particularly selected porous separator 17 providing manufacturability and economical benefits. Prior use of separators with ceramic required a high level of attention to protect against cracking and to provide a proper seal. This necessitated using expensive materials and stringent quality control procedures, resulting in increased scrap and reduced output. The present invention allows for the use of a less expensive separator 17 and NCS layer 15 that can be manufactured to thicknesses of up to about 25 µm without the rigorous quality control requirements of prior separator configurations. The present invention also provides increased protection against dendrite punctures and shorts by combining the NCS 15 and porous separator 17.

By combining the NCS 15 with separator 17, the burden/requirement for a perfectly crack free film is reduced relative to cells having only the NCS separator. It is easier to implement coating technology since the thickness required is reduced by the use of the separator 17 and because the difficulty in coating crack-free increases with thickness. Shorting at anode/cathode interfaces is also reduced.

Figure 3:
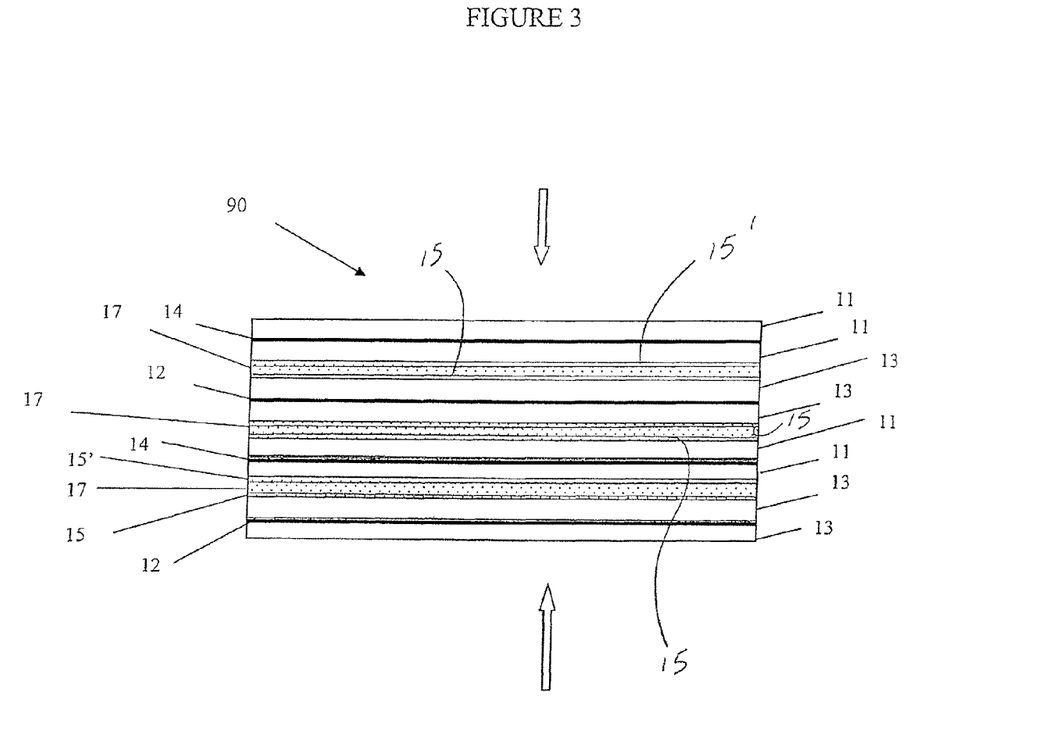
FIG. 3 is a schematic cross-sectional illustration of a stacked electrochemical cell according to one or more embodiments of the invention.

To prepare a laminate electro chemical cell, electrode-coated current collectors and separator membranes can then be stacked to provide a stacked assembly 90 as illustrated in FIG. 3, in which like elements are similarly numbered. Thus, a current collector 14 having anode layers 13 on both sides can have an NCS layer 15 deposited on one side as described herein. Current collector 12 having cathode layers 11 on both sides can also have the NCS layers 15 and 15', and porous or nonporous separator 17 (forming a separator assembly) deposited as described herein. The stacked assembly may be reassembled using various components. The stack may include a cathode/separator assembly, which can then be stacked with anode layers to form the stacked assembly. In other embodiments, an anode/separator assembly is combined with cathode layers to form the stacked assembly. In still other embodiments, cathode/separator assemblies and anode/separator assemblies are used. In this case, the separator thicknesses are adjusted to accommodate the separator assembly from both the anode and cathode assemblies. Any number of cathode and anode layers may be included in the stack A coating method for applying NCS layers is described with reference to FIG. 4. In step 200, the coating solution is prepared including a solvent, solvent-soluble or solvent-miscible polymer and inorganic particles. In one or more embodiments, the polymer, liquid solvents and inorganic ingredients are mixed under low shear for an initial period until ingredients are fully wetted and/or dissolved. The polymer and inorganic may be first mixed in N-methyl pyrrolidinone (NMP) so that a high level of dispersion is achieved. Next, the second solvent is added, and this mixture can then be subjected to a high shear mixture until a desired rheology is obtained. A desirable slurry does not contain large agglomerates and does not quickly phase segregate to separate regions of polymer and inorganic materials upon standing but instead remains well dispersed. Without being bound by any mode or theory of operation, it is believed that the solution rheology provides an indication of distribution of particle sizes and agglomeration behavior as well as total particle concentrations. More complex and asymmetric shapes and a larger number of particles tend to increase the viscosity of a solution. Such slurry properties may play a role in the final structure of the layer.

Figure 4:
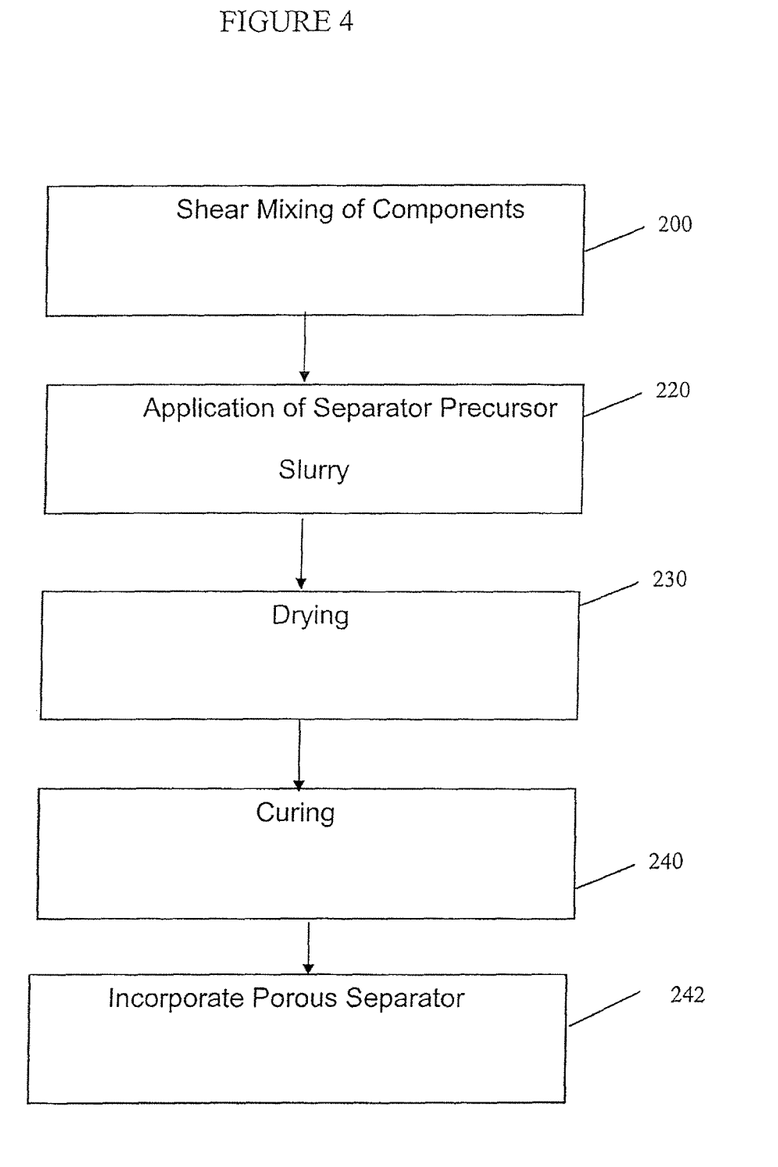
FIG. 4 is a flow diagram of the spray coating process used in one or more embodiments to prepare a separator membrane.

The coating solution is then coated onto at least one surface of an electrode material, as is indicated in step 220. The thickness of the layer coated onto the electrode will depend upon the particular composition of the coating solution and the final thickness desired in the electrochemical cell. Other coating techniques may be employed according to one or more embodiments of the invention, so long as they are susceptible to depositing a composition including a mixed ceramic and particle composition. Exemplary techniques includes doctor blading, roll coating, slot die coating, ink jet printing, spin coating, gravure coating and screen printing, dip coating, or other coating methods. Coating is typically carried out under conditions that provide for solvent welding between the composite separator layer and the adjacent electrode layer.

In one or more embodiments, coating may be accomplished by spraying one or more coats of the applicator coating solution thereonto. By way of example, the separator layer may be applied in about 3 to 5 coating steps, each coating step applying about ⅓ to ⅕ of the total separator layer thickness. As noted above, multipass deposition reduces solvent penetration into the electrode porous layer and can help reduce delamination. It has been surprisingly found that the application of the separator layer in multiple steps significantly reduces the number of defects formed in the final layer. Defects are defined as large pores having dimensions greater than one micron, or cracks in the film. The depositions steps need not apply layers of similar thickness. Thus, a first coating step can deposit a layer of a first thickness and a second step can deposit a layer of a second, different thickness. However, the disclosed combination of the NCS 15 layer and the porous or nonporous separator 17 provides synergistic mechanical attributes that can compensate for such defects, thereby allowing a more efficient manufacturing process by not requiring the extra steps ordinarily needed to address all possible defects.

Following the coating, step 230 illustrates that the solvent is removed from the coating mixture to leave a solid porous body of polymer/ceramic particles on the electrode. The solvent may be removed by evaporation, and this evaporation may be fostered by use of heating and/or low pressure conditions. In some instances, the solvent may be extracted by the use of an extraction solvent which is a non-solvent for the polymer. In one or more embodiments, the solvent optionally may be removed after each spray coating step, so that multiple solvent removal steps may be conducted when multiple spray coating steps are used.

In one or more embodiments, the polymer of the NCS is a thermoplastic and has a glass transition temperature (Tg) and may or may not have a melt temperature (Tm). In one or more embodiments, after coating a layer onto the support, the layer is subjected to a treatment selected to reduce the stress in the layer by curing the layer. The polymers may be cured by treatment above their glass transition or melting temperature so as to modify or enhance its physical properties (step 240). Curing may be accomplished by heating, as is known in the art. The drying step and the curing step may or may not be carried out in serial steps. In the case of thermoplastic polymers, such as PVDF, curing is accomplished by heating the composite beyond the host polymer Tm and then allowing it to cool down. In other embodiments, the layer is heated at or above the glass transition temperature of the polymer binder.

It is believed that the multistep coating approach leads to fewer large cracks in the separator film. While not being bound by any particular mode or theory of operation, the second coating may fill the crevices created in the initial coating to heal any defects of cracks. The porous or nonporous separator 17 is the placed adjacent to the NCS layer 15 (Step 242). A porous separator is wound into the stack with coated electrodes using the well established winding techniques. No changes in winding are required for cells having porous separators. If a nonporous separator is used as the separator film, then the usual winding procedures can be employed.

Nevertheless, the disclosed combination of the NCS layer 15 and the porous or nonporous separator 17 permits a greater tolerance for cracks, while still providing a robust mechanical and physical separator assembly. For example, certain cracks that would otherwise not be tolerable with just an NCS layer 15, are permissible due to the combination including the disclosed porous or nonporous separator 17, thereby providing an efficient solution to the shortcomings of the prior art.

Example 1

Coating with HVLP Spray

A 3 wt % solids loading in a 30:70 NMP:acetone solvent mixture is prepared by thoroughly mixing first PVdF (Kureha) with the fumed silica, and then adding the acetone and further mixing using an orbital mixer. The separator precursor slurry may be applied to either the anode or cathode in a series of passes with the spray gun. A thickness of approximately 20 μm may be achieved in 3-5 coats. For the dual separator approach, e.g., use of both a separator and an NCS, only about 10 μm via two passes is needed. Once the desired thickness is achieved, the electrode is vacuum dried at 80° C. for an hour and then cured at 200° C. for fifteen minutes at ambient pressure.

Example 2

Coating with Comma Coating

The precursor slurry is 5%-10% solids, prepared by the same premixing of PVdF and fumed silica prior to addition of co-solvent, and the films are dried at 100° C. with radiant heat from below and no overhead convection.

Coated electrodes have been tested in lithium ion cells and function well. 350 mAh prismatic cells incorporating only the NCS separator (20 μm) function comparably to membrane separated cells in both limited cycle life and rate performance tests. NCS separated cells show extended cycle life, high power capabilities, and excellent reproducibility for a hand-coated system.

Exemplary dual separator cell designs as pouch cells include:
- 5μ NCS coated graphite anode/Celgard 2320/M1 cathode
- 5μ NCS coated M1 cathode/Celgard 2320/graphite anode
- 2μ NCS coated anode and 3μ NCS cathode with Celgard 2320
- 10μ NCS coated anode with Celgard M824 (12μ thick)
- 9μ NCS coated cathode with Celgard M825 (16μ thick)
- Uncoated graphite anode/Celgard 2320/Uncoated M1 cathode (baseline)

Figure 5:
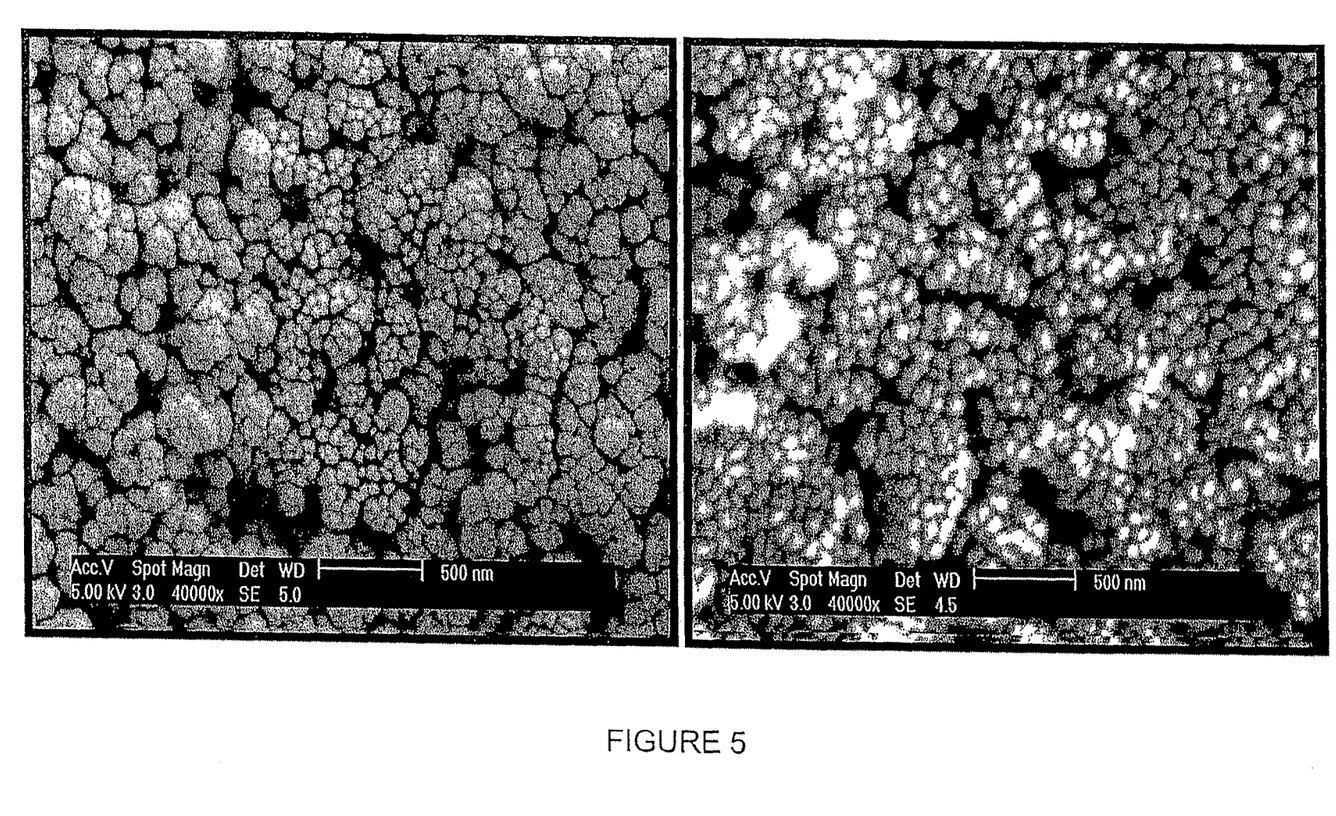
FIG. 5 includes photomicrographs of a separator configuration in accordance with an aspect of the invention.

The combination of the NCS 15 and the separator 17 provides an increased level of safety due to the NCS 15 and separator 17 supplementing each other's physical attributes. FIG. 5 shows a cell structure that was charged to a 100% state of charge (SOC) and then penetrated by a blunt nail, causing massive internal shorting. The entire cell had melted and converted into a monolithic mass—the depicted sample was taken from an outer electrode winding pulled from the cell. The left hand picture shows a scanning electron microscope (SEM) image of a pristine NCS microstructure. The right hand picture shows a SEM image of an NCS microstructure configuration in accordance with the present invention after being penetrated by the nail and being exposure to temperatures in excess of 180° C. The depicted lack of flow/change of the microstructure illustrates the increased safety provided by the NCS coating and porous separator configuration. The use of ceramic in the NCS also creates an added layer of protection for a polyolefin porous separator or nonporous polyethylene oxide or other conducting polymer separators that may melt without such protection.

Figure 6:
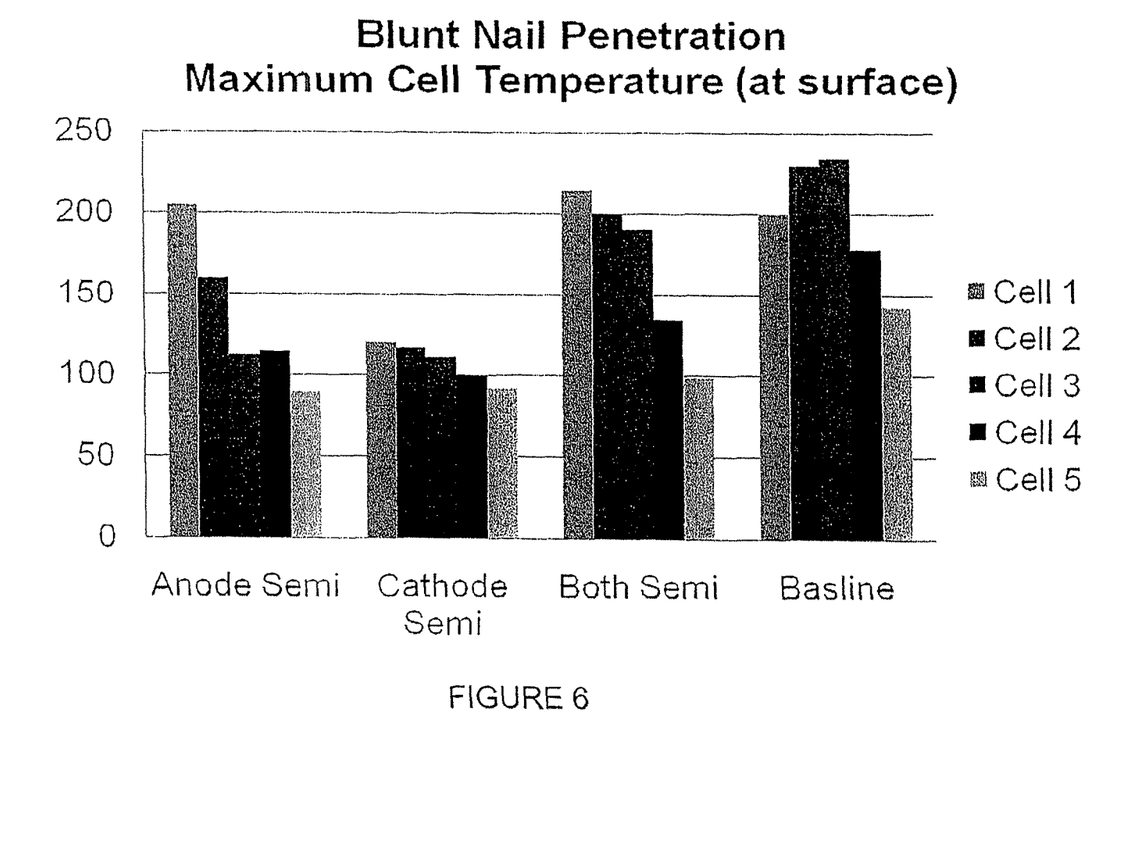
FIG. 6 is a temperature chart representing test cells in accordance with an aspect of the invention and comparison cells.

FIG. 6 is a graph plotting different cell configurations against a baseline configuration. The "anode semi" configuration comprises an NCS layer 15 disposed on the anode, while the porous separator 17 is adjacent to the NCS layer 15 additionally used. An exemplary embodiment of this configuration is shown in FIG. 1. The "cathode semi" configuration comprises the NCS layer 15' disposed on the cathode 11, while the porous separator 17 is adjacent to NCS layer 15', as shown in FIG. 2B. The "both semi" configuration utilizes the NCS layers 15 and 15' on both sides of the porous separator 17, as shown in FIG. 2A. The "baseline" configuration does not utilize the NCS layers and instead provides only a standard porous separator between the anode and cathode.

For each of the different configurations, e.g., anode semi, cathode semi, both semi, and baseline, five cells 1-5 were subjected to a blunt nail penetration test at 100% SOC and the maximum surface temperatures of the cells were recorded. Cell "1" is the far left data column and cell "5" is the far right data column for each grouping. Each of the "anode semi," "cathode semi," and "both semi" configurations provided lower average maximum surface temperatures when compared with the standard "baseline" cell, thus demonstrating the safety advancements provided by the NCS and porous separator configurations of the present invention.

Figure 7:
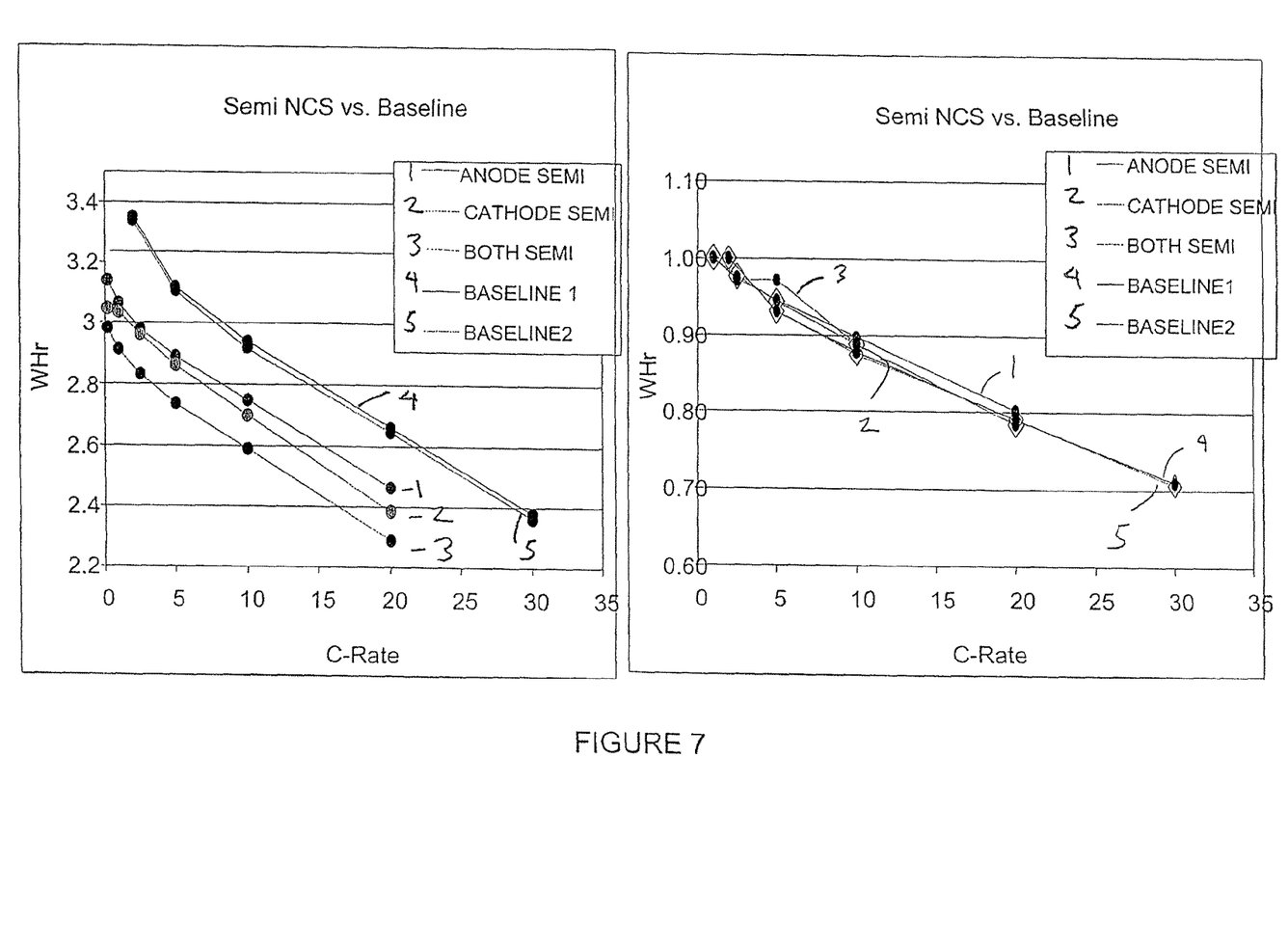
FIG. 7 is a plot of discharge capacity (mAh) vs. power for test cells in accordance with an aspect of the invention and comparison cells.

FIG. 7 is a graph plotting the "anode semi," "cathode semi," and "both semi" configurations against a baseline 1 and baseline 2 cell. The left-side graph shows that the total power the cell drops when using a 20 um porous separator and the NCS coating. The right-side chart shows that when normalized to an active area, the power remains the same in both the baseline and the semi-NCS cells. This data further suggests that the positive, beneficial aspects of using the NCS layer can be improved further in terms of energy density if a very thin separator is used (e.g., a polyolefin which is less than 20μ).

Figure 8:
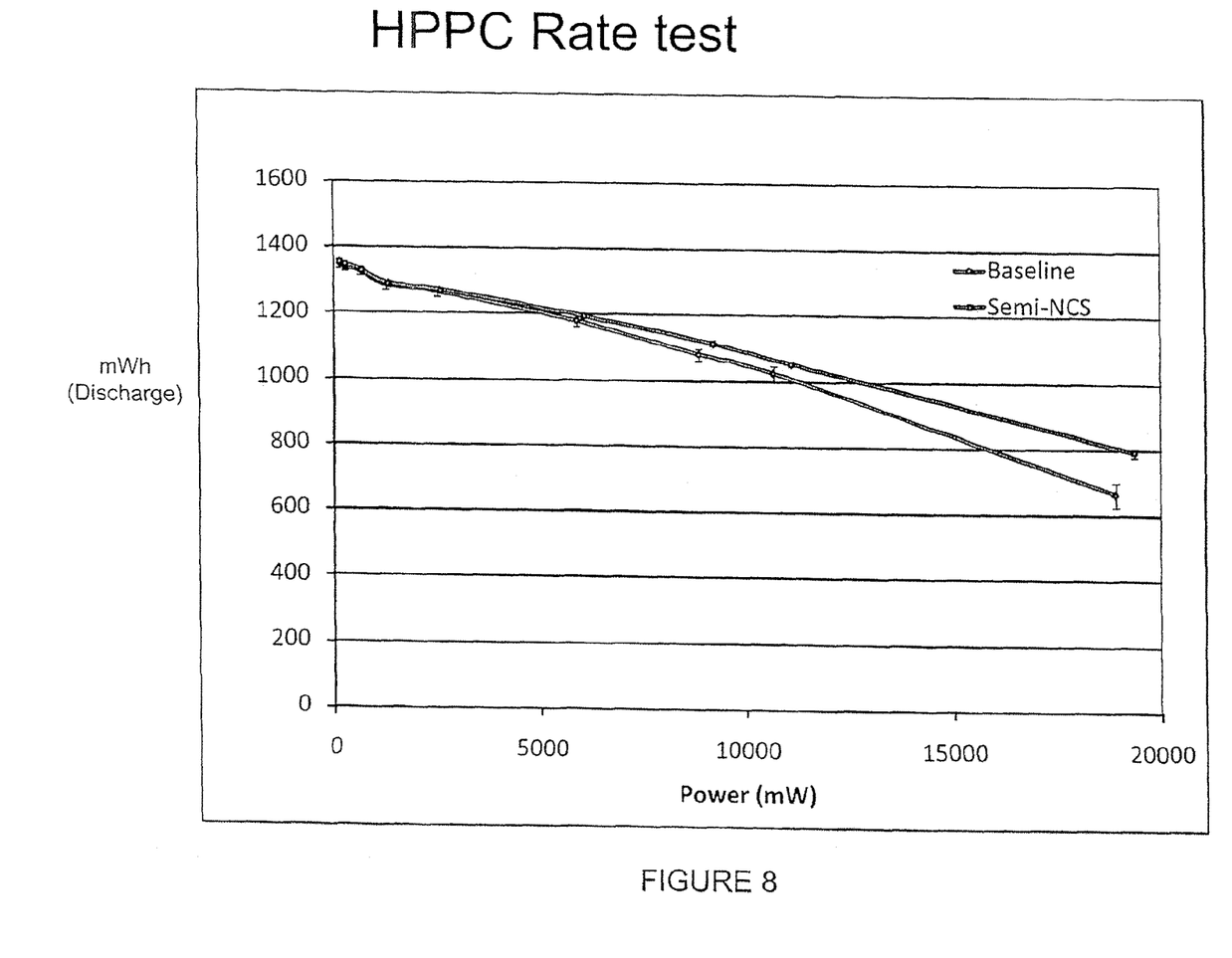
FIG. 8 is a plot of discharge (mWh) vs. power for test cells in accordance with an aspect of the invention and comparison cells.

FIG. 8 represents results of a High Pulse Power Characterization Test (HPPC), which is a power test used in the automotive industry, utilizing a 400 mAh prismatic 10μ NCS cell with a 20μ porous separator. The NCS data is represented by the upper line on the graph. The NCS cell retained more energy at high power discharge than the baseline polyolefin separator cell, which illustrates that the additional 10μ of total separator thickness created by the 10μ NCS layer does not diminish power capabilities. If a thinner porous separator were to be used, the energy/volume would be higher than it is in this example. For this test, the NCS was placed on the cathode, had a separator thickness of 10 um thick, and utilized the 65:35 formulation described above.

Figure 9:
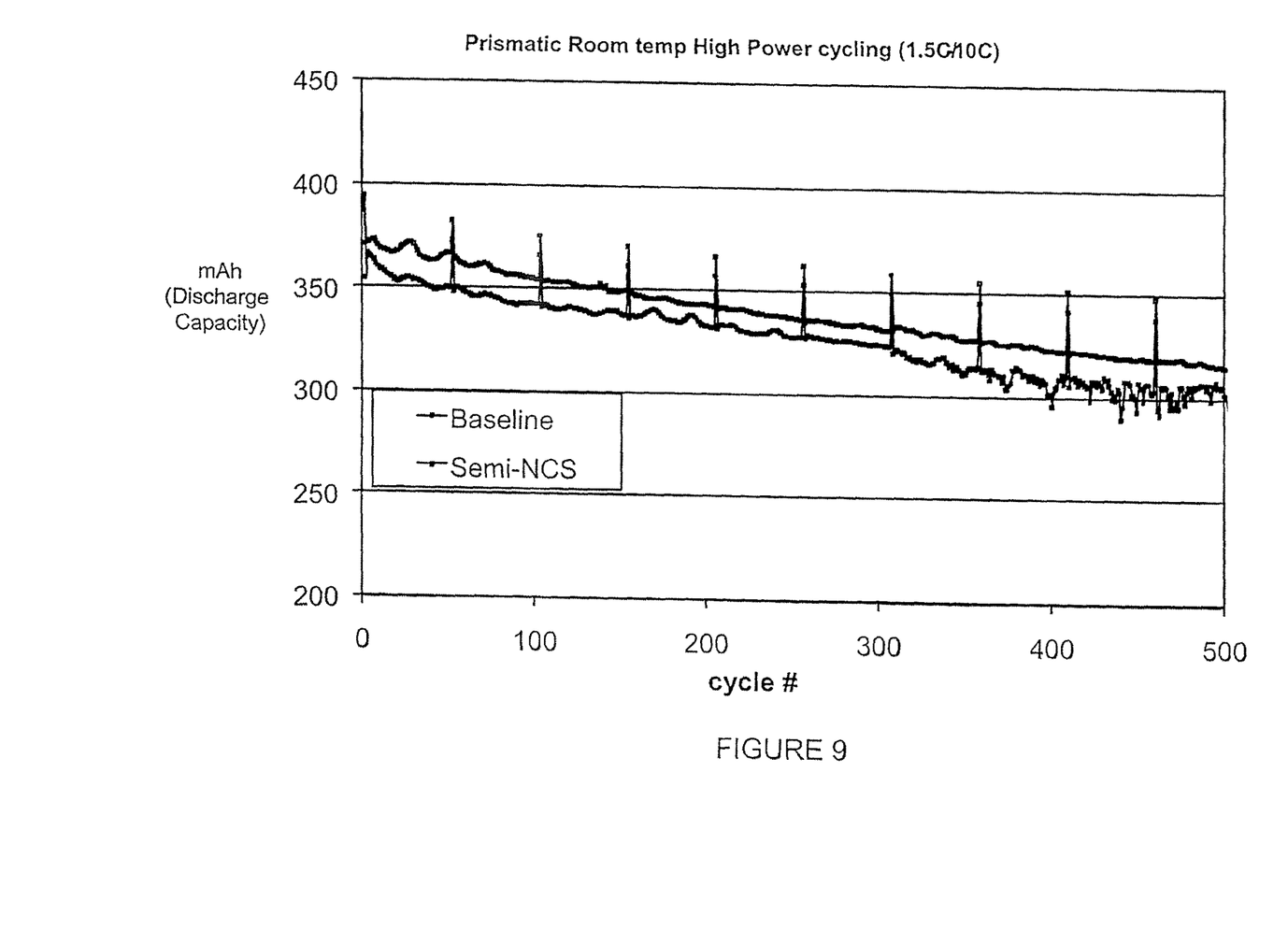
FIG. 9 is a plot of discharge capacity (mAh) vs. cycle for test cells in accordance with an aspect of the invention and comparison cells.

FIG. 9 is a graph plotting data from room temperature high power cycle testing (1.5 C/−10 C) using a semi-NCS or "cathode semi" configuration having a 65:35 formulation with a 20 um thick separator, against a baseline configuration without an NCS layer but with a 20μ thick separator. The data represents an average of two cells for both semi-NCS and baseline. The semi-NCS data is represented by the slightly lower line on the graph. The cells were subjected to cycling at +1.5 C/−10 C. On average, the semi-NCS cells did not drop below 80% initial capacity any sooner than the baseline cells, e.g., same slope to the fade. Likewise, the DC resistance was found to be comparable in both cells. This demonstrates the ability of the present invention to maintain high performance during cycling, while providing an increased factor of safety.

Figure 10:
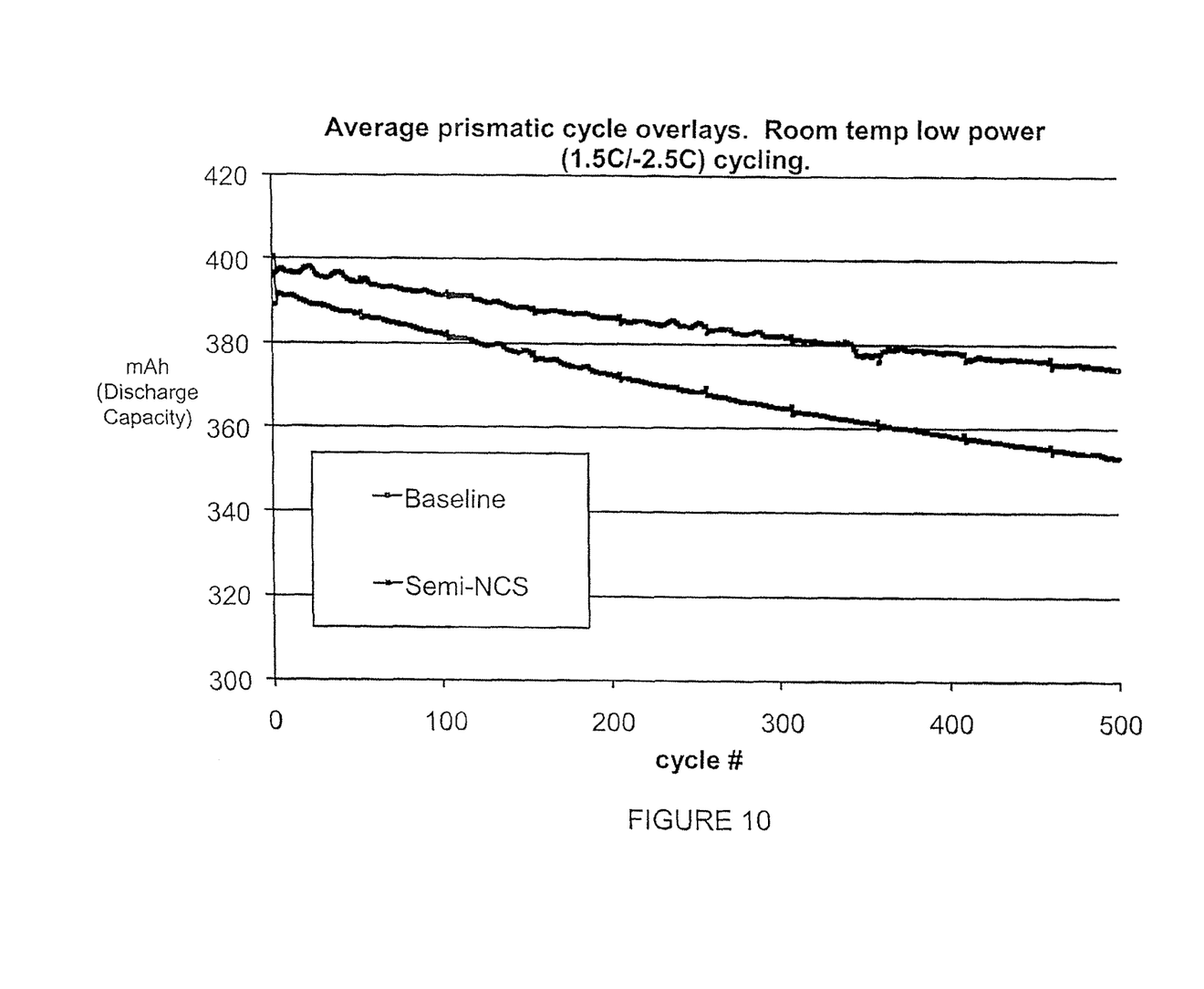
FIG. 10 is a plot of discharge capacity (mAh) vs. cycle for test cells in accordance with an aspect of the invention and comparison cells.

FIG. 10 is a graph plotting data from room temperature low power cycling testing (1.5 C/−2.5 C) using the semi-NCS configuration with 10μ of a 65:35 NCS formulation and a 20μ porous separator, against a baseline configuration without an NCS layer. The data represents an average of two cells for both semi-NCS and baseline. The cathode-NCS data is represented by the lower line on the graph. The cells were subjected to cycling at +1.5 C/−2.5 C. The semi-NCS cells faded faster on average than the baseline cells, yet both cells were above 80% of initial capacity after 500 cycles.

The foregoing illustrates exemplary embodiments of the invention. Other modifications and variations of the invention will be readily apparent to those of skill in the art in view of the teaching presented herein. The foregoing is intended as an illustration, but not a limitation, upon the practice of the invention. It is the following claims, including all equivalents, which define the scope of the invention.

What is claimed is:

1. A Li-Ion electrochemical cell comprising
(a) a positive electrode layer comprising a positive electrode binder;
(b) a negative electrode layer comprising a negative electrode binder,
(c) a porous inorganic and organic composite layer comprising inorganic particles and a composite layer binder interposed between the positive electrode and the negative electrode layers and adjacent to one of the positive and negative electrode layers,
(d) an electrolyte comprising a lithium salt and a non-aqueous solvent,
(e) a porous separator adjacent the composite layer, and
(f) a solvent weld at the interface between the composite layer and the adjacent electrode layer, the weld comprising a mixture of the composite layer binder and the electrode binder;
wherein the combined thickness of the composite layer and the porous separator is not greater than 25 μm.

2. The electrochemical cell of claim 1, wherein the film is a composite layer comprises electrochemically stable inorganic particles having a particle size less than 1 μm in an electrochemically stable binder matrix, and the composite layer has at least a bimodal pore distribution, wherein the first, smaller sized pores are substantially uniformly distributed in the layer, and one or more larger pore sizes are randomly distributed in the layer, wherein the dimension of the pores are nanoscale.

3. The electrochemical cell of claim 1, wherein the porous separator is a microporous polyolefin separator comprising pores greater than 50 Å in diameter and comprises film of at least one of polypropylene and polyethylene.

4. The electrochemical cell of claim 1, wherein the porous separator is a non-woven textile material made from fibers.

5. The electrochemical cell of claim 4, wherein the fibers are held together by at least one of friction, cohesion, and adhesion.

6. The electrochemical cell of claim 1, wherein the porous separator has a thickness in the range of about 9 μm to 15 μm.

7. The electrochemical cell of claim 1, wherein the composite layer has a thickness in the range of about 2 μm to 16 μm.

8. The electrochemical cell of claim 2, wherein first smaller pore size is in the range of about 5-100 nm.

9. The electrochemical cell of claim 2, wherein larger pore size is in the range of about 100-500 nm.

10. The electrochemical cell of claim 2, wherein the particles are substantially monodisperse and have a particle size in the range of about 10-50 nm.

11. The electrochemical cell of claim 1, wherein the composite layer has a pore volume fraction of greater than 25%.

12. The electrochemical cell of claim 1, wherein the composite layer comprises inorganic particles and polymer binder in a weight ratio of about 95:5 to about 40:60 inorganic particles: binder.

13. The electrochemical cell of claim 1, wherein the inorganic portion of the composite layer is selected from the group consisting of silica, alumina, titanium oxide, natural and synthetic zeolites.

14. An electrode/separator assembly for use in an electrochemical cell, comprising:
a current collector;
an electrode layer adhered to the current collector, the electrode layer comprising at least electroactive particles and a binder; and
a porous composite layer disposed on the electrode layer comprising inorganic particles substantially uniformly distributed in a binder matrix to form nanopores;
a solvent weld at the interface between the composite layer and the electrode layer on which it is disposed, the weld comprising a mixture of the composite layer matrix binder and the electrode binder; and
a porous separator disposed adjacent the composite layer on a side opposite that of the electrode layer, wherein the combined thickness of the composite layer and the porous separator is not greater than 25 μm.

15. The electrode/separator assembly of claim 14, wherein the separator comprises a layer of polyethylene oxide.

16. The electrode/separator assembly of claim 14, wherein the inorganic particles have a particle size less than 1 μm in the binder matrix, the layer having at least a bimodal pore distribution, wherein the first, smaller sized pores are substantially uniformly distributed in the layer, and one or more larger pore sizes are randomly distributed in the layer, wherein the dimension of the pores are nanoscale.

17. The electrode/separator assembly of claim 14, wherein the porous separator is a microporous polyolefin separator comprising pores greater than 50 Å in diameter and comprises film of at least one of polypropylene and polyethylene.

18. The electrode/separator assembly of claim 14, wherein the porous separator is a non-woven textile material made from fibers.

19. The electrode/separator assembly of claim 18, wherein the fibers are held together by at least one of friction, cohesion, and adhesion.

20. The electrode/separator assembly of claim 14, wherein the porous separator has a thickness in the range of about 9 μm to 15 μm.

21. The electrode/separator assembly of claim 14, wherein the composite layer has a thickness in the range of about 2 μm to 16 μm.

22. The electrode/separator assembly of claim 16, wherein first smaller pore size is in the range of about 5-100 nm.

23. The electrode/separator assembly of claim 16, wherein larger pore size is in the range of about 100-500 nm.

24. The electrode/separator assembly of claim 14, wherein the inorganic particles are substantially monodisperse and have a particle size in the range of about 10-50 nm.

25. The electrode/separator assembly of claim 14, wherein the composite layer has a pore volume fraction of greater than 25%.

26. The electrode/separator assembly of claim 14, wherein the composite layer comprises inorganic particles and polymer binder in a weight ratio of about 95:5 to about 40:60 inorganic particles: binder.

27. The electrode/separator assembly of claim 14, wherein the inorganic portion of the composite layer is selected from the group consisting of silica, alumina, titanium oxide, natural and synthetic zeolites.

28. The electrochemical cell of claim 1, wherein the separator comprises a layer of polyethylene oxide.

29. The electrochemical cell of claim 1, wherein the composite layer binder is in the range of 35-55 wt %.

30. The electrochemical cell of claim 29, wherein the solvent does not penetrate more than 90% of the thickness of the positive or negative electrode layer.

31. The electrode/separator assembly of claim 14, wherein the composite layer binder is in the range of 35-55 wt %.

32. The electrochemical cell of claim 31, wherein the solvent does not penetrate more than 90% of the thickness of the positive or negative electrode layer.

\* \* \* \* \*

UNITED STATES PATENT AND TRADEMARK OFFICE
CERTIFICATE OF CORRECTION

| | |
|---|---|
| PATENT NO. | : 8,852,787 B2 |
| APPLICATION NO. | : 12/240855 |
| DATED | : October 7, 2014 |
| INVENTOR(S) | : Less et al. |

It is certified that error appears in the above-identified patent and that said Letters Patent is hereby corrected as shown below:

In the claims
Claim 2:
Column 11 line 48, delete "film is a" between "the" and "composite".

Signed and Sealed this
Twenty-second Day of March, 2016

Michelle K. Lee
*Director of the United States Patent and Trademark Office*